United States Patent
Hill

(10) Patent No.: US 11,987,359 B2
(45) Date of Patent: May 21, 2024

(54) AUTOMATIC PACKAGE DELIVERY SYSTEM AND RELATED METHODS

(71) Applicant: Insitu, Inc. a subsidiary of The Boeing Company, Bingen, WA (US)

(72) Inventor: Nathaneal Fletcher Hill, Leesburg, VA (US)

(73) Assignee: Insitu, Inc., a subsidiary of The Boeing Company, Bingen, WA (US)

( * ) Notice: Subject to any disclaimer, the term of this patent is extended or adjusted under 35 U.S.C. 154(b) by 138 days.

(21) Appl. No.: 17/737,304

(22) Filed: May 5, 2022

(65) Prior Publication Data
US 2022/0380051 A1    Dec. 1, 2022

Related U.S. Application Data

(60) Provisional application No. 63/192,872, filed on May 25, 2021.

(51) Int. Cl.
*B64D 1/12*    (2006.01)
*B64U 101/64*    (2023.01)

(52) U.S. Cl.
CPC ............ *B64D 1/12* (2013.01); *B64U 2101/64* (2023.01)

(58) Field of Classification Search
CPC ... B64D 1/08; B64D 1/12; B64D 1/02; B64D 1/00; B64D 1/06; B64U 2101/69; B64U 2101/64; B64U 2101/60; B64U 2101/66
See application file for complete search history.

(56) References Cited

U.S. PATENT DOCUMENTS

2018/0265222 A1* 9/2018 Takagi ................. G05D 1/0676
2020/0047353 A1* 2/2020 Zheng .................... B25J 15/022

FOREIGN PATENT DOCUMENTS

CN     110398983 A  * 11/2019
WO   WO-2017120620 A1 *  7/2017

* cited by examiner

*Primary Examiner* — Joshua J Michener
*Assistant Examiner* — Arfan Y. Sinaki
(74) *Attorney, Agent, or Firm* — Kolitch Romano Dascenzo Gates LLC

(57) ABSTRACT

Delivery systems for aerial vehicles may provide a passive automatic delivery system that is automatically triggered during landing of the aerial vehicle. One or more arm assemblies of the delivery system may include a respective landing arm, resilient member, and package guide. The landing arm is configured to rotate in response to an applied external force, with the resilient member being operatively coupled to the landing arm and configured to bias the landing arm towards a resting position. The package delivery system automatically releases the package when a delivery condition is met, such as the landing arms of the delivery system being rotated past a threshold position. Delivery systems can thus passively and automatically ensure that all landing arms are on a landing surface before the package is released. Related methods include approaching and contacting a landing surface, and releasing the package at the landing surface of the delivery location.

20 Claims, 6 Drawing Sheets

AUTOMATIC PACKAGE DELIVERY SYSTEM AND RELATED METHODS

RELATED APPLICATION

The present application is a non-provisional of and claims priority to U.S. Provisional Patent Application No. 63/192,872, filed on May 25, 2021, entitled "PACKAGE DELIVERY SYSTEMS AND RELATED METHODS," the complete disclosure of which is incorporated by reference.

FIELD

The present disclosure relates generally to a package delivery system and related methods.

BACKGROUND

Aerial vehicles used to deliver packages typically involve complex package release systems to release the package from the aerial vehicle at the appropriate time and place. Such complex package release systems tend to be costly and are prone to delivery errors such as releasing the package too early and/or failing to release the package at the appropriate time. In some cases, packages may be released before the aerial vehicle has reached the landing surface, or gotten close enough to the landing surface, such that packages may be damaged upon delivery. Processing on-board the aerial vehicle may inaccurately detect landing or incorrectly trigger release of the package, due to sensor errors, environmental factors, and/or other errors in processing.

SUMMARY

Presently disclosed delivery systems for aerial vehicles advantageously may provide a passive, automatic delivery system that is automatically triggered during landing of the aerial vehicle to address issues with prior art aerial vehicle package release systems.

In one example, a delivery system for an aerial vehicle includes a first arm assembly that has a first landing arm, a first resilient member, and a first package guide. The first landing arm is configured to rotate in response to an applied external force, between a first resting position of the first landing arm and a first splayed position of the first landing arm. The first resilient member is operatively coupled to the first landing arm and configured to bias the first landing arm towards the first resting position. The first package guide is configured to at least partially retain a package in a stored position when the first landing arm is in the first resting position. The first package guide is coupled with respect to the first landing arm such that rotation of the first landing arm causes corresponding rotation of the first package guide, and the first package guide is configured to guide the package from the stored position to a released position when the first landing arm is rotated towards the first splayed position and to or past a first threshold landing position. Said first threshold landing positon is in between the first resting position and the first splayed position.

In an example, an automatic package delivery system for delivering a package contained within an internal volume of the aerial vehicle includes a first arm assembly and a second arm assembly. The first arm assembly includes a first forward landing arm and a first aft landing arm, with the first forward landing arm and the first aft landing arm being linked together such that the first forward landing arm and the first aft landing arm are configured to rotate together in response to a first external force applied to the first forward landing arm and/or the first aft landing arm. The first forward landing arm and the first aft landing arm are configured to rotate between a first resting position and a first splayed position. Similarly, the second arm assembly includes a second forward landing arm and a second aft landing arm, with the second forward landing arm and the second aft landing arm being linked together such that the second forward landing arm and the second aft landing arm are configured to rotate together in response to a second external force applied to the second forward landing arm and/or the second aft landing arm. The second forward landing arm and the second aft landing arm are configured to rotate between a second resting position and a second splayed position. The automatic package delivery system is configured to retain the package within the internal volume until a delivery condition is met. Further, the automatic package delivery system is configured to automatically release the package from the internal volume when the delivery condition is met, thereby delivering the package. The delivery condition may be a passive delivery condition that depends on positioning of the first arm assembly and the second arm assembly.

In disclosed methods for automatically delivering a package contained within an internal volume of an aerial vehicle, a package is retained within the internal volume while a delivery condition is unmet, the aerial vehicle is caused to approach a landing location surface where the package is to be delivered, and the package is released from the internal volume to deposit the package on the landing location surface. To trigger release of the package, the aerial vehicle contacts the landing location surface with a first forward landing arm, a first aft landing arm, a second forward landing arm, and a second aft landing arm of an automatic package delivery system of the aerial vehicle. Said contacting causes the first forward landing arm and the first aft landing arm to rotate to or past a first threshold landing position, and the contacting further causes the second forward landing arm and the second aft landing arm to rotate to or past a second threshold landing position, thereby meeting the delivery condition.

DESCRIPTION

Figure 1:
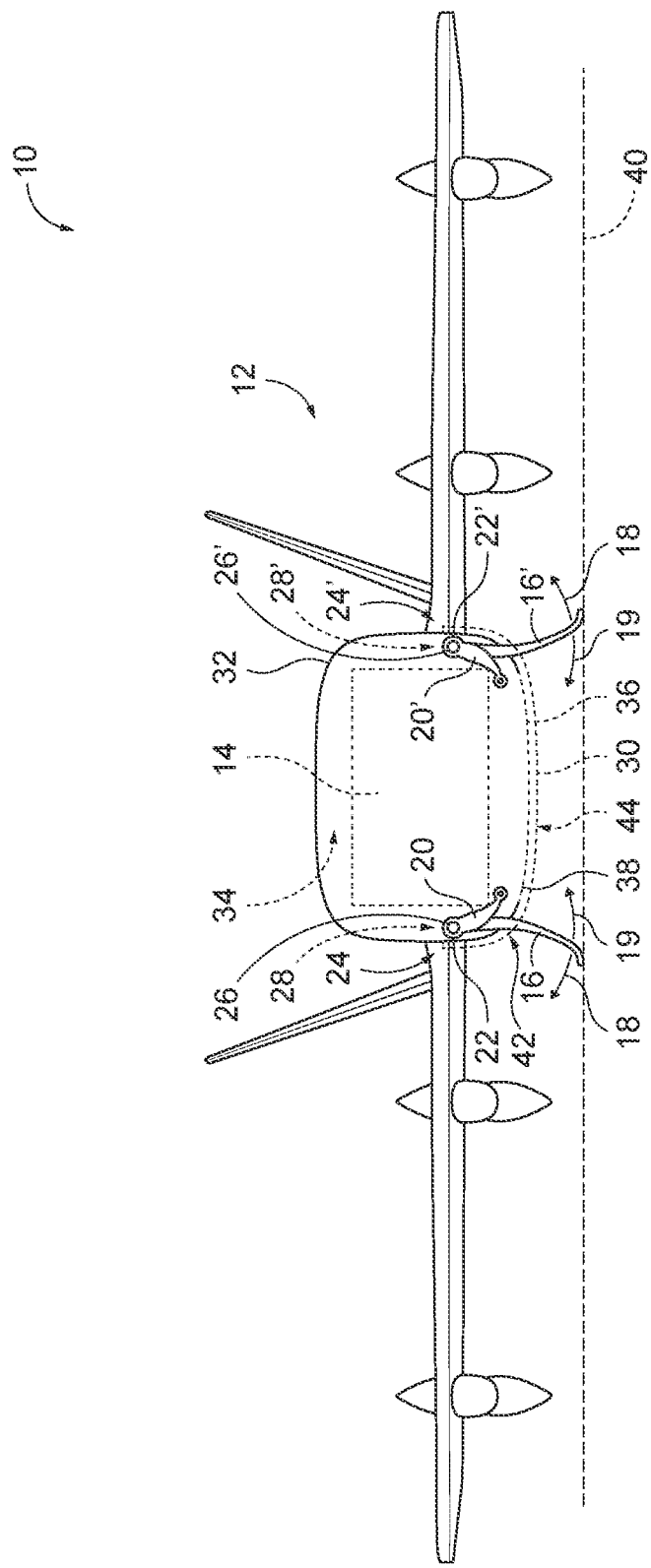
FIG. 1 is a schematic representation of illustrative, non-exclusive examples of delivery systems according to the present disclosure.

FIG. 1 schematically provides illustrative, non-exclusive examples of delivery systems 10 according to the present disclosure. Elements, components, and/or features that are discussed herein with reference to FIG. 1 may be included in and/or utilized with any of the examples shown in other FIGS. herein without departing from the scope of the present disclosure. In general, elements that are likely to be included in a given (i.e., a particular) example are illustrated in solid lines, while elements that are optional to a given example are illustrated in dashed lines. However, elements that are shown in solid lines are not essential to all examples, and an element shown in solid lines may be omitted from a particular example without departing from the scope of the present disclosure.

Delivery systems 10 according to the present disclosure generally are configured to be delivery systems 10 for an aerial vehicle 12, such as to deliver a package 14 from aerial vehicle 12. Delivery system 10 includes one or more landing arms 16 configured to splay, or rotate (e.g., in the directions indicated by arrows 18, 19) in response to an applied external force. Rotation of landing arms 16 causes corresponding movement, or rotation of one or more respective package guides 20, and in turn results in release of package 14 once landing arms 16 have been rotated a sufficient amount, as will be explained in detail herein. One or more resilient members 22 are operatively coupled to landing arms 16 to bias landing arms 16 towards a resting position. Together, one or more landing arms 16, one or more package guides 20, and one or more resilient members 22 may be referred to as an arm assembly 24, though various examples of arm assemblies 24 include additional elements as well. For example, arm assembly 24 also may include a shaft 26 and/or a locking mechanism 28. Some delivery systems 10 include a flexible fairing 30 secured to a body 32 of aerial vehicle 12 and/or to one or more arm assemblies 24.

One or more package guides 20 may be configured to at least partially retain package 14 in a stored position until package 14 is delivered. For example, one or more package guides 20 may apply pressure to the surface of package 14 (e.g., a bottom surface and/or side surfaces of package 14) to retain package 14 in the stored position. Additionally or alternatively, one or more package guides 20 may be positioned to prevent package 14 from being released from the stored position. For example, one or more package guides 20 may be positioned relative to package 14 to prevent movement of package 14 through an opening 36 of body 32 of aerial vehicle 12. Said opening 36 may be formed on an underside 38 of body 32 of aerial vehicle 12, which may face a landing surface 40 (also referred to herein as a landing location surface 40) when aerial vehicle 12 lands on landing surface 40. In some examples, one or more package guides 20 may be positioned and configured to block or obstruct part of opening 36, thereby preventing package 14 from exiting through opening 36. Once landing arms 16 are rotated past a threshold landing position, package guides 20 may be configured to guide package 14 from the stored position as aerial vehicle 12 ascends away from landing surface 40 where delivery system 10 is configured to deliver package 14.

In some delivery systems 10, in the stored position, package 14 is retained within an internal volume 34 of aerial vehicle 12, such as shown in FIG. 1. Thus, some delivery systems 10 are configured to deliver package 14 from within internal volume 34, with the stored position of package 14 being inside or within internal volume 34. In other examples, package 14 may have a stored position that is on the outside of body 32 of aerial vehicle 12, such as by being placed in a rack or coupled to aerial vehicle 12 via a bracket or other support device. In some examples, package 14 may have a stored position that is on an upper side or surface of aerial vehicle 12 (e.g., opposite the underside 38 of aerial vehicle 12 which contacts or faces a landing surface when aerial vehicle 12 lands). In some examples, package 14 may have a stored position in which package 14 is partially contained within internal volume 34 and partially exterior to internal volume 34. Package guides 20 may vary accordingly in location relative to aerial vehicle 12 and package 14, depending on how package 14 is stored and the location of the stored position of package 14.

Package 14 may be retained in the stored position until package 14 is delivered by aerial vehicle 12. To deliver package 14, landing arms 16 are configured to rotate in response to an applied external force, as noted above. The applied external force can be, for example, a force applied to one or more landing arms 16, generally due to contact between landing arms 16 and landing surface 40 during landing. Applied external forces additionally or alternatively may be applied to either side of landing arm 16, and/or to other components of arm assembly 24. Landing arms 16 may be rotated in response to various externally applied forces and/or in response to biasing forces from resilient members 22. Landing arms 16 may rotate in a first direction (e.g., along arrows 18) in response to externally applied forces such as from ground reaction forces when contacting landing surface 40. Generally, resilient members 22 may be configured to apply a biasing force to urge landing arms 16 in a second direction towards a resting position (e.g., along arrows 19), which may be an opposite or opposing direction from rotation of landing arms 16 due to contact with landing surface 40. Landing arms 16 may have a range of motion, being selectively rotated between the resting position and a splayed position (e.g., each respective landing arm 16 may have a respective resting position and a respective splayed position). The resting position of each landing arm 16 is generally the position of the landing arm when no external forces are being applied to the landing arm—the resting position is generally determined by biasing forces from one or more resilient members 22 and the configuration of arm assembly 24. The splayed position of each landing arm 16 is generally the position that represents the maximum range of movement of each landing arm 16.

Figure 2:
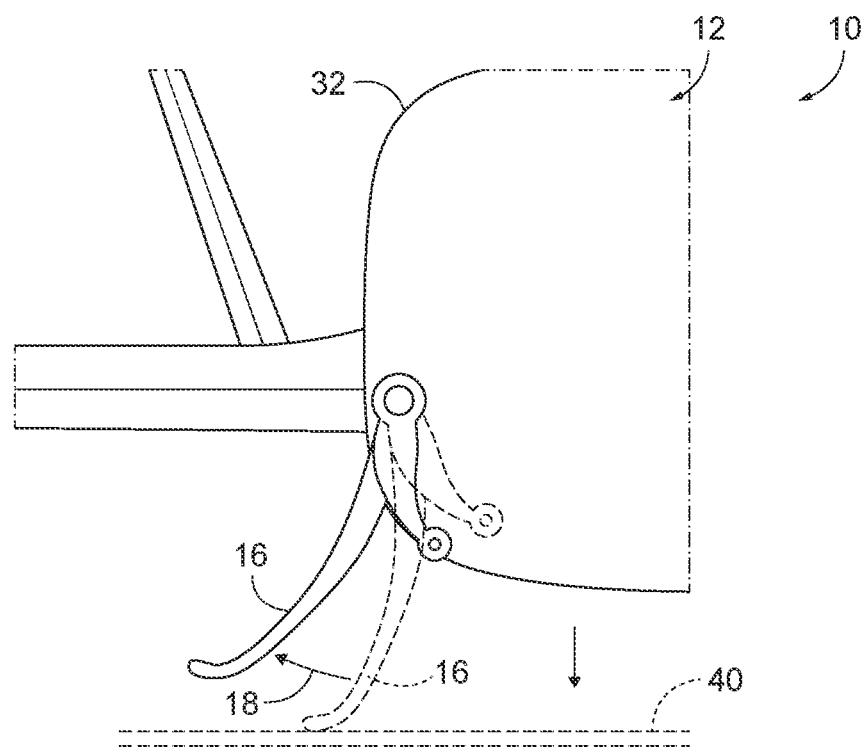
FIG. 2 is a schematic representation of a portion of an example of presently disclosed delivery systems, representing movement of the landing arms.

For example, FIG. 2 schematically illustrates an example of the range of movement of landing arm 16, with landing arm 16 being shown in dashed lines in the resting position, and being shown in solid lines having been rotated to or towards the splayed position (in a direction generally indicated by arrow 18). With continued reference to FIG. 1, resilient members 22 apply biasing forces to landing arms 16 such that resilient members 22 are configured to bias landing arms 16 towards each landing arm's respective resting position. Due to the biasing forces of resilient members 22, landing arms 16 are in their resting positions when there is substantially no external force applied to landing arm 16, such when aerial vehicle 12 is airborne. In some examples, the resting positions of landing arms 16 are substantially constant both in the presence and absence of package 14 in the stored position. In other words, the resting position of landing arms 16 may be substantially the same position both before and after delivery of package 14, and regardless of the weight of package 14. Resilient members 22 may be selected and/or selectively adjusted such that each respective resilient member 22 only allows the respective landing arm(s) 16 operatively coupled to it to actuate or rotate towards or to a threshold landing position when a force that is greater than half of a maximum load, but less than the full empty weight of aerial vehicle 12 is applied to landing arm(s) 16.

When landing arms 16 are in the resting position, package guides 20 are configured to at least partially retain package 14 in the stored position. In some examples, package guides 20 are independently capable of retaining package 14 in the stored position when landing arms 16 are in the resting position. In some examples, various other aspects of arm assembly 24 and/or delivery system 10 (e.g., flexible fairing 30) work together with package guides 20 to retain package 14 in the stored position while landing arms 16 are in the resting position. Each package guide 20 may be coupled with respect to one or more landing arms 16 such that rotation of each landing arm 16 causes corresponding rotation of one or more respective package guides 20. For example, in some examples of delivery system 10, one or more arm assemblies 24 each include a respective package guide 20 for each respective landing arm 16, with the position and orientation of each respective package guide 20 being at least substantially fixed with respect to a respective landing arm 16. To this end, a given package guide 20 and landing arm 16 may be integrally formed, or otherwise configured to be substantially fixed with respect to one another, such that rotation of landing arm 16 also includes rotation of package guide 20.

Said rotation of package guides 20 is configured to guide package 14 from the stored position, to deliver package 14, once landing arm 16 is rotated a threshold amount towards, or to, the splayed position. For example, delivery systems 10 may be configured to deliver package 14 from the stored position once landing arm 16 is rotated to or past the threshold landing position. The threshold landing position is generally between the resting position of landing arm 16 and the splayed position of landing arm 16 (which may represent the maximum degree of rotation of landing arm 16), though in some examples landing arm 16 may be rotated to the splayed position before delivery system 10 delivers package 14 (in other words, the threshold landing position may be the same as the splayed position in some examples of delivery system 10). Landing arms 16 may be configured to rotate in a smooth range of positions between the resting position and the splayed position, in response in applied external forces and/or biasing forces from resilient members 22. In other examples, landing arms 16 may be configured to rotate between predefined discrete positions. Depending on the direction of the applied external force, increasing the applied external force (such as by having more of the weight of aerial vehicle 12 supported by landing surface 40, as it lands) may cause landing arm 16 to rotate towards the splayed position (e.g., in direction of arrow 18), while decreasing the applied external force (such as by aerial vehicle 12 starting to lift off from landing surface 40) may cause landing arm 16 to rotate towards the resting position (e.g., in the direction of arrow 19), due to the biasing forces from resilient members 22.

Delivery system 10 generally includes a second arm assembly 24' that mirrors first arm assembly 24, and which may be positioned opposite first arm assembly 24. Thus, first arm assembly 24 may include one or more first landing arms 16, first shaft 26, one or more first resilient members 22, and one or more first package guides 20, while second arm assembly 24' may similarly include one or more second landing arms 16', second shaft 26', one or more second resilient members 22', and one or more second package guides 20'. Second arm assembly 24' generally is configured to operate the same as first arm assembly 24. Thus, one or more first and second package guides 20, 20' may be configured to work together to retain package 14 within the stored position while first and second landing arms 16, 16' have not been rotated to or past their threshold landing positions. Delivery system 10 may be configured to deliver (e.g., release) package 14 only when all landing arms 16, 16' of first arm assembly 24 and second arm assembly 24' contact landing location surface 40 such that first landing arm 16 (or first landing arms 16) are rotated towards their first splayed position and past the first threshold landing position and such that the second landing arm 16' (or second landing arms 16') are rotated towards the second splayed position and past their second threshold landing position. In other words, delivery systems 10 may be configured to only allow splaying of landing arms 16, 16' if all landing arms 16, 16' are bearing weight on landing location surface 40.

In examples where first arm assembly 24 includes two or more first landing arms 16, each first landing arm 16 may be operatively coupled to first shaft 26. In such examples, first arm assembly 24 generally also includes two or more first package guides 20, each of which also may be operatively coupled to first shaft 26. As used herein, landing arms 16 and package guides 20 may be said to be "operatively coupled" to shaft 26 even if they are not directly coupled, but are coupled with respect to each other in such a way that the components operate as described herein. Each first landing arm 16 may be configured to rotate together proportionally to the applied external force applied to one or more of first landing arms 16. In other words, all first landing arms 16 may be configured to rotate together even if the applied external force is applied to just one or a subset of the first landing arms 16. This may be accomplished via coupling between first landing arms 16 and first shaft 26, and/or via another coupling or arrangement between respective first landing arms 16. Further, each first package guide 20 may be configured to rotate together in accordance with rotation of first landing arms 16, such that all first landing arms 16 rotate together and accordingly all first package guides 20 rotate together, via first arm assembly 24.

Similarly, in examples where second arm assembly 24' includes two or more second landing arms 16', each second landing arm 16' may be operatively coupled to second shaft 26'. In such examples, second arm assembly 24' generally also includes two or more second package guides 20', each of which also may be operatively coupled to second shaft 26'. Each second landing arm 16' may be configured to rotate together proportionally to the applied external force applied to one or more of second landing arms 16'. In other words, all second landing arms 16' may be configured to rotate together even if the applied external force is applied to just one or a subset of the second landing arms 16'. This may be accomplished via coupling between second landing arms 16' and second shaft 26', and/or via another coupling or arrangement between respective second landing arms 16'. Further, each second package guide 20' may be configured to rotate together in accordance with rotation of second landing arms 16', such that all second landing arms 16' rotate together and accordingly all second package guides 20' rotate together, via second arm assembly 24'.

Each resilient member 22 of delivery system 10 may be, for example, a torsion spring. In other examples, one or more resilient members 22 may be a different type of spring, or other form of resilient member 22. Each arm assembly 24 may be configured such that rotation of each landing arm 16 causes a change in mechanical energy stored in one or more respective resilient members 22. For example, when landing arm 16 is rotated in a first direction (e.g., along arrow 18)

toward the splayed position, the amount of mechanical energy stored in resilient member 22 increases, such that it applies an increasing biasing force that biases landing arm 16 in the opposite direction towards its resting position. When the external applied force is reduced or removed from landing arm 16 (e.g., when aerial vehicle 12 lifts off of landing surface 40), resilient member 22 may cause landing arm 16 to rotate back towards the resting position (e.g., in the direction indicated by arrow 19). In some examples, delivery system 10 includes a respective resilient member 22 for each respective landing arm 16. In some examples, delivery system 10 may include a different number of resilient members 22 than landing arms 16. One or more of resilient members 22 may have a selectively adjustable tension, such as to account for varying weights of packages 14 to be delivered, and/or varying weights of aerial vehicle 12. For example, the tension of resilient members 22 may be selectively adjusted to a lower tension to deliver a given package 14 having a lower weight, and the tension of resilient members 22 may be selectively adjusted to a higher tension to deliver a given package 14 having a higher weight. In some examples, the tension of one or more resilient members 22 may be selectively adjusted to a level such that landing arms 16 are configured to resist rotation towards the splayed position as a result of the weight of package 14 alone. Similarly, the tension of resilient member 22 may be configured such that package guides 20 resist rotation as a result of pressure applied to package guides 20 from package 14. Because each package guide 20 is generally fixed with respect to a given landing arm 16, increasing the tension of resilient member 22 may be configured to increase rotation resistance in both package guide 20 and landing arm 16.

Arm assembly 24 also may include one or more shafts 26, each of which may extend along a portion of opening 36 to internal volume 34. One or more landing arms 16, one or more resilient members 22, and/or one or more package guides 20 may be operatively coupled to each shaft 26. In some examples, one or more landing arms 16 and one or more package guides 20 may rotate about a respective shaft 26. For example, a first landing arm 16 and a first package guide 20 may rotate about a first shaft 26, while a second landing arm 16' and a second package guide 20' may rotate about a second shaft 26'. In some examples, landing arms 16 and package guides 20 may be coupled to shaft 26 such that rotation of shaft 26 results in rotation of landing arm 16 and package guide 20 with shaft 26. In some examples, rotation of landing arm 16 may change the position of landing arm 16 relative to internal volume 34. For example, at least a portion of landing arm 16 may be positioned within internal volume 34 when landing arm 16 is in its resting position and/or in its splayed position, in some examples (e.g., an anchor point of landing arm 16 where it is coupled with respect to shaft 26). As the landing arm 16 is rotated towards its splayed position, it may be moved such that a larger portion of it is exterior to internal volume 34, or the proportion of landing arm 16 within internal volume 34 may be substantially the same as it is moved between the resting position and the splayed position. In some examples, the entirety of landing arm 16 is external to internal volume 34 in both the resting position and the splayed position. In some delivery systems 10, landing arms 16 also may have a stowed position, in which they are at least partially stowed and/or at least substantially entirely stowed within internal volume 34, such as during flight after package 14 is delivered. In some examples, landing arms 16 may be selectively rotated past their resting positions (e.g., away from the splayed positions) to be positioned in the stowed position.

As noted above, each package guide 20 may have a substantially fixed orientation with respect to a respective landing arm 16. For example, first package guide 20 may have a fixed orientation with respect to first landing arm 16, while second package guide 20' may have a fixed orientation with respect to second landing arm 16'. In some examples, package guides 20 are at least partially positioned within internal volume 34 no matter what position landing arms 16 are in. Specifically, package guide 20 may be partially or wholly positioned within internal volume 34 both when landing arm 16 is in the resting position and when landing arm 16 is in the splayed position. In some examples, package guide 20 may be a least partially positioned within internal volume 34 when landing arm 16 is in the resting position, and at least partially positioned outside internal volume 34 when landing arm 16 is in the splayed position.

Delivery systems 10 generally are configured for automatic, passive delivery of package 14, with said automatic passive delivery being tied to landing of aerial vehicle 12, and/or contact between aerial vehicle 12 and landing surface 40. Again, delivery systems 10 are configured to retain package 14 in the stored position until a delivery condition is met, such as while landing arm 16 is in the resting position, and while landing arm 16 is between the resting position and the threshold landing position. Delivery systems 10 may be configured such that satisfying the delivery condition may be passively and mechanically determined, rather than relying on sensors and/or processing units. Once landing arm 16 (e.g., all landing arms 16 of delivery system 10) are rotated to or past each landing arm's threshold landing position, delivery system 10 releases package 14 from the stored position. Delivery systems 10 are said to automatically release package 14 from the stored position because said release occurs automatically as a result of mechanical movement of components of arm assembly 24, rather than as a result of electronic actuation due to a processing unit or remote control of aerial vehicle 12. In other words, the mechanism of delivery system 10 that delivers package 14 is mechanically connected to landing arms 16 and actuated by landing of aerial vehicle 12 on landing location surface 40 where package 14 is intended to be delivered, because package guides 20 are directly actuated by movement of landing arms 16 during landing of aerial vehicle 12.

In some delivery systems 10, arm assembly 24 is configured such that landing arm 16 is prevented from rotating to or past its threshold landing position while one or more landing arms 16 are spaced apart from landing location surface 40. In other words, the delivery condition for release of package 14 from the stored position may include configuring delivery system 10 to ensure that all landing arms 16 are on landing surface 40 before package 14 is released from the stored position. Put another way, each arm assembly 24 may be configured such that landing arms 16 do not rotate to or past the threshold landing position unless the delivery condition is met. For example, resilient members 22 may be configured such that landing arms 16 are sufficiently rotated for delivery only when all landing arms 16 are contacting landing surface 40. In this manner, delivery system 10 may be configured to prevent delivery of package 14 if, for example, only one side of aerial vehicle 12 has landed, and thus body 32 is tipped or not level. Landing arms 16 may be configured to automatically return to their resting positions once aerial vehicle 12 is again airborne after releasing package 14 and departing from landing location surface 40.

In some examples, the delivery condition for releasing package 14 from the stored position comprises at least a minimum loading force being applied to each arm assembly 24 (e.g., to each landing arm 16 of delivery system 10). For example, said minimum loading force may be at least 25% of the vehicle weight of aerial vehicle 12 when aerial vehicle 12 is devoid of package 14, such that a total loading force applied to the first arm assembly 24 and the second arm assembly 24' is at least 50% of the vehicle weight. In some examples, the minimum loading force may correspond to 25% of a loaded vehicle weight of aerial vehicle 12 combined with package 14, such that a total loading force applied to first arm assembly 24 and second arm assembly 24' is at least 50% of the loaded vehicle weight. In other words, delivery system 10 may be configured such that the threshold landing position of each arm assembly 24 corresponds to 50% or more of the combined total weight of aerial vehicle 12 and package 14 being applied across first arm assembly 24 and second arm assembly 24'. Additionally or alternatively, the delivery condition may comprise at most a maximum loading force being applied to each of first arm assembly 24 and second arm assembly 24'. For example, the maximum loading force may correspond to the vehicle weight of aerial vehicle 12 when aerial vehicle 12 is devoid of package 14, or the maximum loading force may correspond to the loaded vehicle weight of aerial vehicle 12 combined with package 14. Thus, if too much weight is applied to one of the landing arms 16, indicating that the other landing arm 16 may not be in contact with landing surface 40, package 14 will not be released from its stored position.

In examples of delivery system 10 including flexible fairing 30, said flexible fairing 30 may cover at least part of opening 36 to internal volume 34. In some examples, flexible fairing 30 may include one or more slits 42 through which respective landing arms 16 may extend through. In some examples, flexible fairing 30 includes a respective slit 42 for each respective landing arm 16 in delivery system 10. Flexible fairing 30 may be configured to at least partially retain package 14 within the stored position (e.g., within internal volume 34) prior to delivery, and in conjunction with package guides 20. For example, flexible fairing 30 may be configured to provide some support for an underside of package 14. Additionally or alternatively, flexible fairing 30 may be configured to improve aerodynamic properties of aerial vehicle 12, as compared to opening 36 being merely uncovered and open to air during flight of aerial vehicle 12. For example, flexible fairing 30 may be configured to eliminate or reduce parasitic drag as aerial vehicle 12 is in flight. Additionally or alternatively, flexible fairing 30 may be configured to limit an impact force at which package 14 is delivered from stored position, such as by slowing the speed at which package 14 exits or is released from the stored position. Flexible fairing 30 may include an outlet orifice 44 through which delivery system 10 may be configured to deliver package 14 from the stored position. In other words, package 14 may be configured to pass through outlet orifice 44 as it exits the stored position (e.g., as it exits internal volume 34). Said outlet orifice 44 is star-shaped in some examples, but any suitable shape may be used. Further, flexible fairing 30 may be configured to stretch, such that outlet orifice 44 may be enlarged as landing arms 16 are moved towards the splayed position and as package 14 passes through outlet orifice 44. In an illustrative example, flexible fairing 30 may comprise silicone, though any suitable material(s) may be used for flexible fairing 30. For example, other suitable materials for flexible fairing 30 may include flexible materials that are somewhat rigid or strong until acted on by an external force (e.g., due to rotation of package guides 20 such that they are pressed into flexible fairing 30). Flexible fairing 30 may be coupled to aerial vehicle 12, such that it is stretched over first landing arms 16 and second landing arms 16'. Flexible fairing 30 may be coupled to aerial vehicle 12 such that it is stretched over all landing arms 16 of delivery system 10, in some examples.

In examples of delivery system 10 including one or more locking mechanisms 28 (which may be referred to herein as a landing lock 28, or a landing lock mechanism 28), locking mechanism 28 may be configured to add an extra fallback mechanism to prevent early release of package 14 from the stored position. For example, in the event of an emergency landing, locking mechanism 28 may be configured to retain package 14 in the stored position even though landing arms 16 may be in a position that would otherwise trigger delivery of package 14 by releasing it from the stored position. In other words, while locking mechanism 28 is engaged, package 14 may be retained in the stored position even if landing arms 16 are rotated past the threshold landing position that would otherwise allow for release and delivery of package 14. In some examples, locking mechanism 28 may include a first locking mechanism 28 configured to engage with first arm assembly 24 to prevent early release of package 14, and a second locking mechanism 28' configured to engage with second arm assembly 24' to prevent early release of package 14. In an illustrative example, locking mechanism 28 may include a servo lock to prevent rotation of landing arm 16 while locking mechanism 28 is engaged, or locking mechanism 28 may be configured to physically retain package 14 in the stored position while locking mechanism 28 is engaged. In some examples, locking mechanism 28 may be released (e.g., disengaged) during descent of aerial vehicle 12, but before touchdown and release of package 14.

As used herein, package 14 can include any type of package or object suitable for delivery by aerial vehicle 12, including but not limited to boxes, cartons, envelopes, containers, food, pharmaceuticals or medicines, healthcare products or supplies, resupply goods, postal deliveries, samples, and/or equipment. Aerial vehicle 12 can be any unmanned aerial vehicle, which may include drones, autonomous aircraft, remote-controlled aircraft, fixed wing aircraft, multi-rotor aircraft, single rotor aircraft, and/or hybrid vertical take-off and landing (VTOL) aircraft.

Turning now to FIGS. 3-7, illustrative non-exclusive examples of delivery systems 10 are illustrated. Where appropriate, the reference numerals from the schematic illustrations of FIGS. 1-2 are used to designate corresponding parts of FIGS. 3-7; however, the examples of FIGS. 3-7 are non-exclusive and do not limit delivery systems 10 to the illustrated examples of FIGS. 3-7. That is, delivery systems 10 are not limited to the specific examples illustrated in FIGS. 3-7 and may incorporate any number of the various aspects, configurations, characteristics, properties, etc. that are illustrated in and discussed with reference to the schematic representations of FIGS. 1-2 and/or the examples of FIGS. 3-7, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again in FIGS. 3-7; however, it is within the scope of the present disclosure that the previously discussed features, variants, etc. may be utilized with the illustrated examples of delivery system 10.

Figure 3:
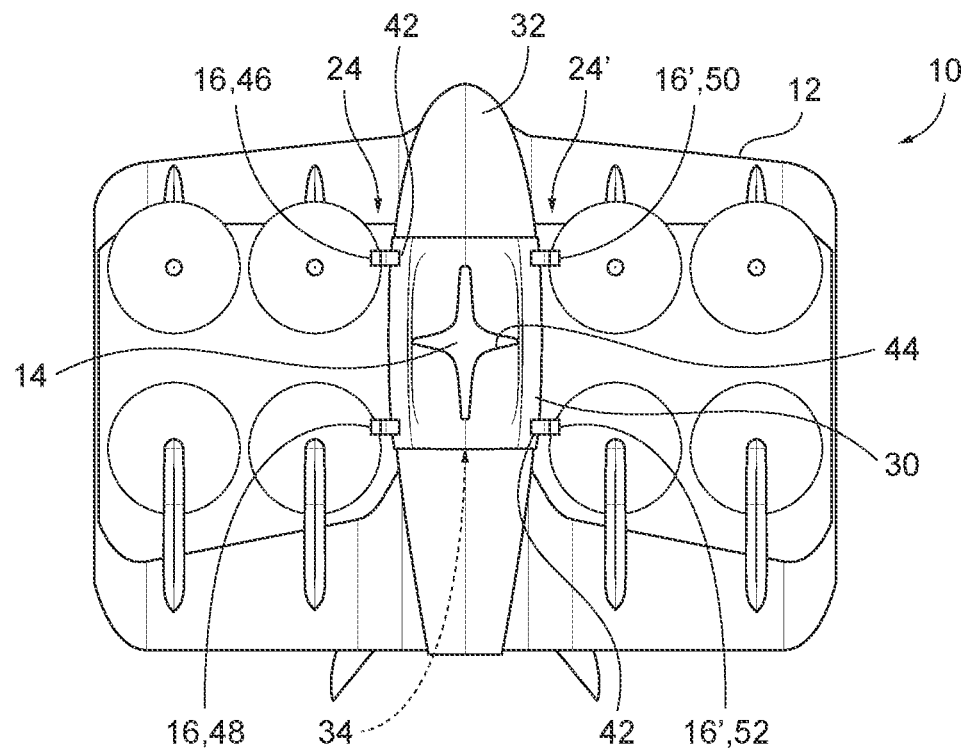
FIG. 3 is a bottom plan view of an example of an aerial vehicle equipped with a presently disclosed delivery system.

FIG. 3 illustrates an example of delivery system 10 as used with aerial vehicle 12, shown from the bottom of aerial vehicle 12. Package 14 is shown in its stored position within internal volume 34 of body 32 of aerial vehicle 12, with a portion of package 14 being visible through outlet orifice 44 of flexible fairing 30. This example of delivery system 10 includes four landing arms 16—two first landing arms 16 (e.g., a first forward landing arm 46 and a first aft landing arm 48) and two second landing arms 16' (e.g., a second forward landing arm 50 and a second aft landing arm 52). Said landing arms 46, 48, 50, 52 are at least partially visible, namely, landing arms 46, 48, 50, 52 extend through slits 42 of flexible fairing 30 such that at least a portion of each landing arm 46, 48, 50, 52 is visible outside of body 32 of aerial vehicle 12. In some examples, flexible fairing 30 is coupled to aerial vehicle 12 such that it is stretched over (e.g., around) first forward landing arm 46, first aft landing arm 48, second forward landing arm 50, and second aft landing arm 52. Additionally or alternatively, flexible fairing 30 may be secured to aerial vehicle 12 via an adhesive and/or a fastening means.

Flexible fairing 30 may be coupled to first arm assembly 24 and second arm assembly 24' such that outlet orifice 44 enlarges when first forward landing arm 46 and first aft landing arm 48 rotate towards the first maximally splayed position and when second forward landing arm 50 and second aft landing arm 52 rotate towards the second maximally splayed position. For example, landing arms 16 may pull on flexible fairing 30 via applying tension at or around slits 42 as they rotate towards their splayed positions, which may stretch flexible fairing 30 and enlarge outlet orifice 44. Additionally or alternatively, package guides 20 may push on, or apply pressure to, an internal surface of flexible fairing 30 as package guides 20 rotate outwardly due to rotation of landing arms 16, which may stretch flexible fairing 30 and enlarge outlet orifice 44 to allow package 14 to exit through outlet orifice 44. In other words, in some examples, package 14 may not be the primary force expanding outlet orifice 44 of flexible fairing 30. Flexible fairing 30 may be configured to at least partially retain package 14 within internal volume 34, in conjunction with package guides 20.

Figure 4:
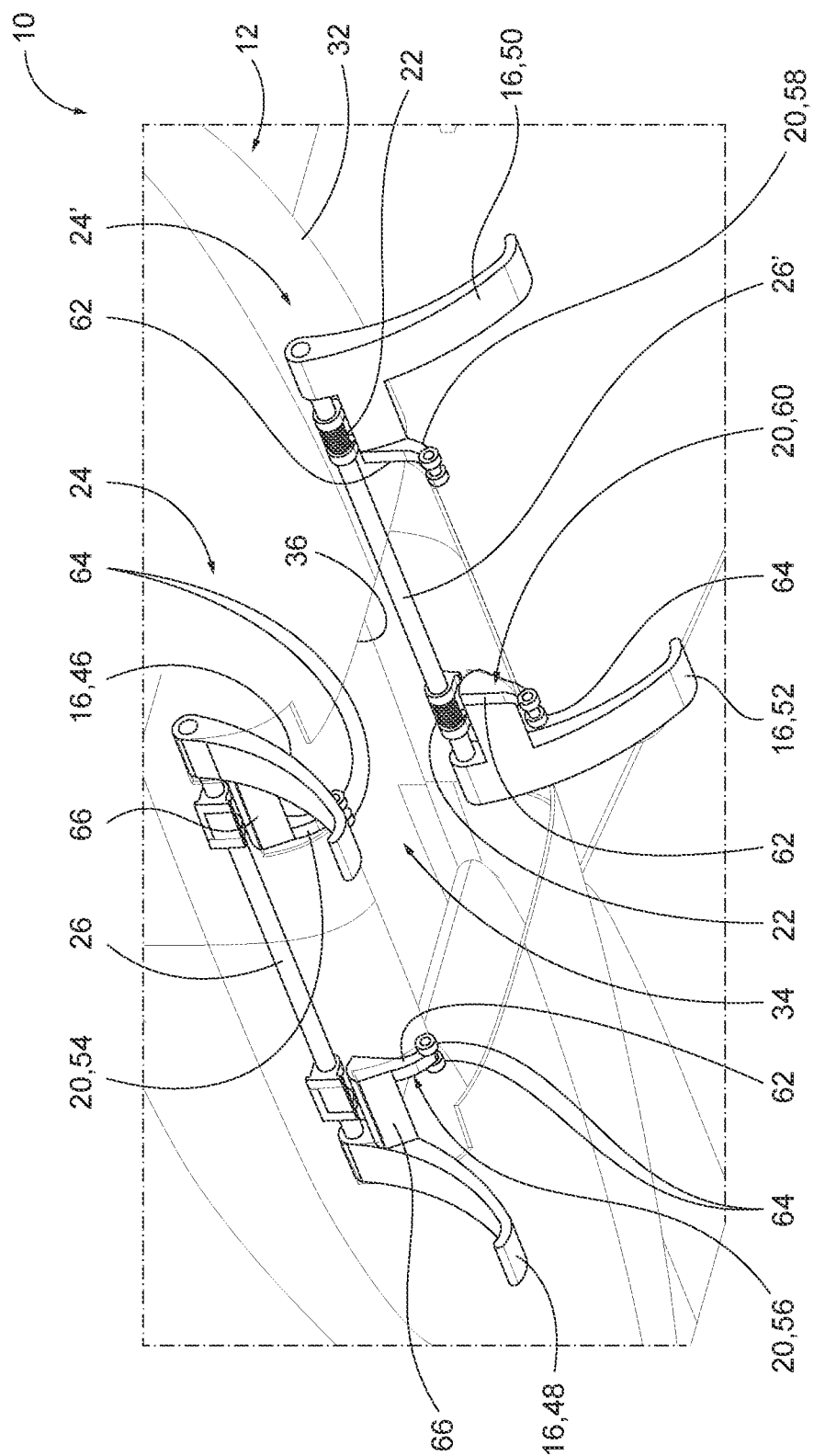
FIG. 4 is a perspective view of an example of a delivery system according to the present disclosure.

First forward landing arm 46 and first aft landing arm 48 are operatively coupled to first shaft 26, as best seen in FIG. 4. In FIG. 4, first arm assembly 24 and second arm assembly 24' are shown, with flexible fairing 30 not shown, for clarity. First arm assembly 24 also includes two package guides 20, specifically, a first forward package guide 54 and a first aft package guide 56. Similarly, second arm assembly 24' also includes two package guides 20, specifically, a second forward package guide 58 and a second aft package guide 60. First forward package guide 54 and first aft package guide 56 are operatively coupled to first shaft 26, and second forward package guide 58 and second aft package guide 60 are operatively coupled to second shaft 26'. First shaft 26 is configured to couple first forward landing arm 46 and first aft landing arm 48 such that landing arms 46, 48 rotate together between their resting position (e.g., a first resting position) and their splayed position (e.g., a first splayed position). First forward package guide 54 is positioned adjacent, coupled to, and/or integrally formed with first forward landing arm 46. First forward package guide 54 generally is configured to have a substantially fixed orientation with respect to first forward landing arm 46, such that first forward package guide 54 rotates about or with first shaft 26 to substantially the same extent that first forward landing arm 46 rotates about or with first shaft 26. Similarly, first aft package guide 56 is positioned adjacent, coupled to, and/or integrally formed with first aft landing arm 48. First aft package guide 56 generally is configured to have a substantially fixed orientation with respect to first aft landing arm 48, such that first aft package guide 56 rotates about or with first shaft 26 to substantially the same extent that first aft landing arm 48 rotates about or with first shaft 26. In this manner, as first forward landing arm 46 and first aft landing arm 48 are rotated between their first resting position and their first splayed position, first forward package guide 54 and first aft package guide 56 also are rotated. When first forward landing arm 46 and first aft landing arm 48 are rotated past the first threshold landing position, first forward package guide 54 and first aft package guide 56 are positioned to allow package 14 to be released from its stored position, such that package 14 may be delivered by delivery system 10.

Second arm assembly 24' mirrors first arm assembly 24. Specifically, second shaft 26' is configured to couple second forward landing arm 50 and second aft landing arm 52 such that landing arms 50, 52 rotate together between their resting position (e.g., a second resting position) and their splayed position (e.g., a second splayed position). Second forward package guide 58 is positioned adjacent, coupled to, and/or integrally formed with second forward landing arm 50. Second forward package guide 58 generally is configured to have a substantially fixed orientation with respect to second forward landing arm 50, such that second forward package guide 58 rotates about or with second shaft 26' to substantially the same extent that second forward landing arm 50 rotates about or with second shaft 26'. Similarly, second aft package guide 60 is positioned adjacent, coupled to, and/or integrally formed with second aft landing arm 52. Second aft package guide 60 generally is configured to have a substantially fixed orientation with respect to second aft landing arm 52, such that second aft package guide 60 rotates about or with second shaft 26' to substantially the same extent that second aft landing arm 52 rotates about or with second shaft 26'. In this manner, as second forward landing arm 50 and second aft landing arm 52 are rotated between their second resting position and their second splayed position, second forward package guide 58 and second aft package guide 60 also are rotated. When second forward landing arm 50 and second aft landing arm 52 are rotated past the second threshold landing position, second forward package guide 58 and second aft package guide 60 are positioned to allow package 14 to be released from its stored position, such that package 14 may be delivered by delivery system 10.

First and second package guides 20, 20' together (e.g., first forward package guide 54, first aft package guide 56, second forward package guide 58, and second aft package guide 60) may be configured to guide package 14 out of internal volume 34 as aerial vehicle 12 ascends away from landing location surface 40 where delivery system 10, which may be referred to herein as automatic package delivery system 10, delivered package 14. As best seen in FIG. 4, package guides 20 (e.g., first forward package guide 54, first aft package guide 56, second forward package guide 58, and second aft package guide 60) each may include a support extension 62 and at least one roller 64. In the example of FIG. 4, each package guide 20 includes two rollers 64, though other examples of package guides 20 may include more or fewer rollers 64, or other surfaces or mechanisms designed to facilitate delivery of package 14 from aerial vehicle 12. For example, in addition to or instead of one or more rollers 64, various examples of package guides 20 may include friction-reducing surfaces or structures, cushioning surfaces or structures, compressible surfaces or structures, inflatable surfaces or structures, a spring-tensioned structure, a segmented gripping mechanism (e.g., a claw), and/or bearings.

Support extensions 62 of package guides 20 may be shaped and contoured such that they are curved inwardly, towards package 14 when it is in its stored position, towards internal volume 34 of aerial vehicle 12, and/or away from the respective landing arm or arms 16 they are fixed with respect to. In other words, each respective support extension 62 of each respective package guide 20 may extend in a respective first direction away from a respective second direction of a respective corresponding landing arm 16. For example, support extension 62 of first aft package guide 56 curves in a first direction inwardly towards internal volume 34, and away from a second direction in which first aft landing arm 48 extends (first aft landing arm 48 curves outwardly and away from internal volume 34). Support extensions 62 of package guides 20 on opposite sides of opening 36 of internal volume 34 may effectively extend towards each other, because each support extension 62 is generally configured to extend towards package 14 when it is in its stored position. For example, support extension 62 of first forward package guide 54 generally extends towards support extension 62 of second forward package guide 58 because they are positioned on opposite sides of opening 36 and both extend towards where package 14 would be positioned in its stored position.

Delivery systems 10 may be configured such that support extensions 62 and/or rollers 64 (or other structure of package guides 20) contact, or are engaged with, package 14 while it is in its stored position. In some examples, support extensions 62 are configured to underlie and/or support package 14 to at least partially retain it within its stored position. Rollers 64 may contact or engage with package 14 in the stored position and/or as package 14 is delivered and released from the stored position. In some examples, rollers 64 may only contact package 14 once package guides 20 have rotated with landing arms 16 a sufficient amount such that package 14 is released and exits the stored position (e.g., internal volume 34). For example, as a result of landing arms 16 having rotated past their threshold landing positions, package guides 20 may have been rotated to obstruct less of opening 36 to internal volume 34, such that package 14 is no longer retained in internal volume 34 by package guides 20 and package 14 is released from the stored position via gravity. As package 14 exits the stored position, rollers 64 may be configured to reduce friction between package 14 and aerial vehicle 12 such that package 14 may exit smoothly, while support extensions 62 of package guides 20 may still exert some pressure on package 14 such that it does not fall out through opening 36 too quickly. In some examples, delivery system 10 is configured such that package 14 is partially released from the stored position once aerial vehicle 12 has sufficiently landed (and landing arms 16 are all rotated to or past their threshold landing positions), and fully released from the stored position as aerial vehicle ascends from the landing/delivery surface. In other words, package 14 may be partially within internal volume 34 as aerial vehicle 12 starts to depart from landing surface 40 (FIG. 1), with package 14 being entirely out from its stored position (e.g., delivered onto landing surface 40) once aerial vehicle 12 lifts off from landing surface 40, such that package 14 remains at (e.g., is delivered to) landing location surface 40.

Delivery system 10 may be configured to automatically release package 14 from internal volume 34 of aerial vehicle 12, thereby delivering package 14, only if all of first forward landing arm 46, first aft landing arm 48, second forward landing arm 50, and second aft landing arm 52 are in contact with a landing location surface (e.g., landing surface 40) on which automatic package delivery system 10 is configured to deliver package 14. In other words, automatic package delivery system 10 may be configured such that package 14 is not delivered if any of first forward landing arm 46, first aft landing arm 48, second forward landing arm 50, or second aft landing arm 52 are spaced apart from landing location surface 40. In this manner, it may be said that the delivery condition that must be met before package 14 is delivered includes having all of first forward landing arm 46, first aft landing arm 48, second forward landing arm 50, and second aft landing arm 52 being in contact with landing location surface 40.

Figure 5:
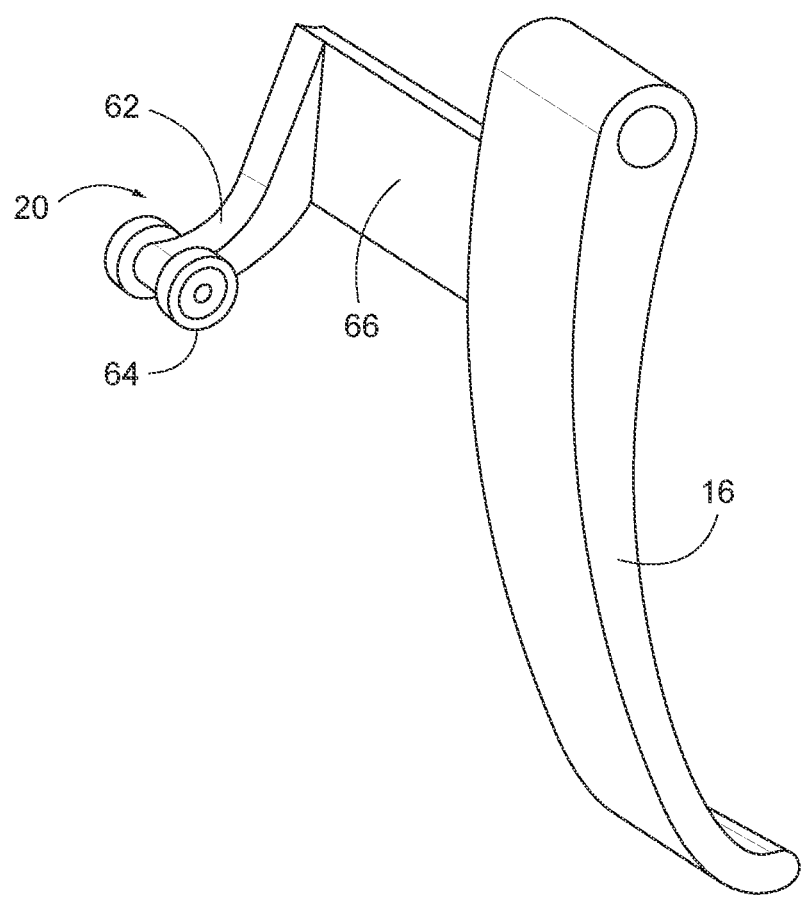
FIG. 5 is a perspective view of an example of a landing arm and package guide component of an example of presently disclosed delivery systems.

FIG. 5 illustrates an example of landing arm 16 and package guide 20, without other structures of delivery system 10, for clarity. As shown, landing arm 16 and package guide 20 may be integrally formed together, such that they are a monolithic body. In other examples, landing arm 16 and package guide 20 may be coupled together in such a way that they are in at least substantially fixed orientations with respect to one another.

Each arm assembly 24 may include a stop 66 configured to limit rotation of landing arm 16 such that it does not rotate past the splayed position. For example, stop 66 may be configured to contact body 32 of aerial vehicle 12 to prevent further rotation of landing arms 16. For example, as best seen in FIG. 4, respective first stops 66 for each respective first landing arm 16 may contact aerial vehicle 12 body 32 within internal volume 34 once first arm assembly 24 rotates far enough such that first stops 66 are rotated into contact with aerial vehicle 12. This may prevent further rotation of first arm assembly 24 past the splayed position (e.g., a maximally splayed position), though first arm assembly 24 is free to rotate in the opposite direction, back towards the resting position of first landing arms 16. Each stop 66 may directly or indirectly contact or engage with body 32 of aerial vehicle 12 to limit rotation of a respective arm assembly 24 past the splayed position.

Figure 6:
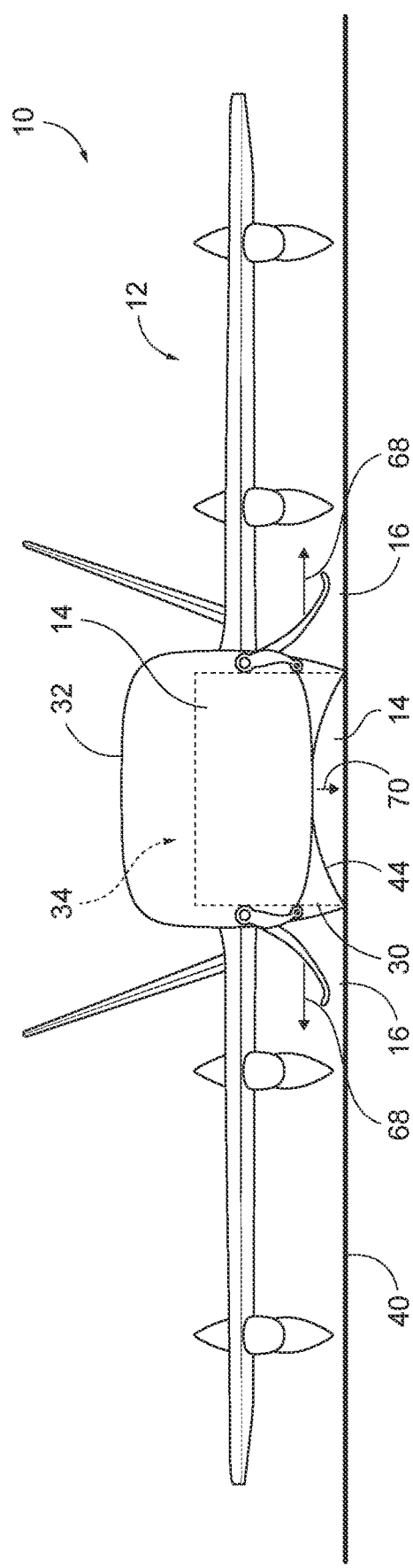
FIG. 6 is a front elevation view of an aerial vehicle initiating delivery of a package via an example of presently disclosed delivery systems.
Figure 7:
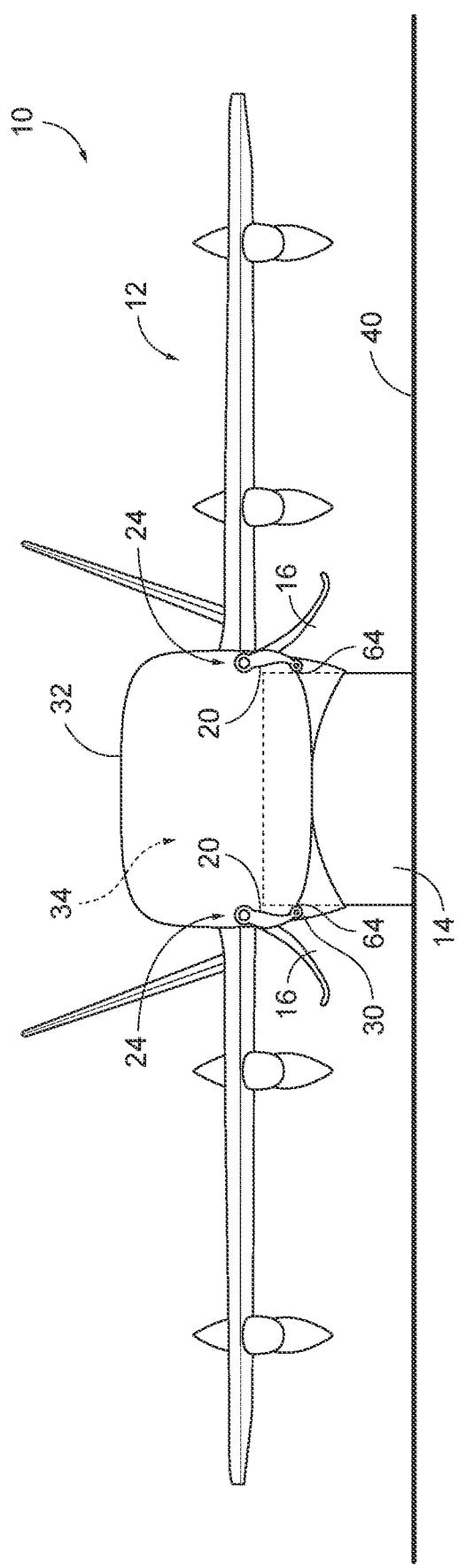
FIG. 7 is a front elevation view of the aerial vehicle of FIG. 6, shown departing from the delivery location.

FIGS. 6-7 illustrate an example of delivery system 10 delivering package 14 on landing location surface 40. FIG. 6 shows landing arms 16 being rotated or splayed outward (e.g., in the directions indicated by arrows 68) due to weight of aerial vehicle 12 being applied on landing arms 16 when landing arms 16 contact landing location surface 40 as aerial vehicle 12 approaches and lands on landing location surface 40. As illustrated, outlet orifice 44 of flexible fairing 30 has begun to enlarge as package 14 exits internal volume 34 of aerial vehicle 12 and moves towards landing location surface 40, in the direction indicated by arrow 70. FIG. 7 shows aerial vehicle 12 being positioned above landing location surface 40, with landing arms 16 being no longer in contact with landing location surface 40 as aerial vehicle 12 lifts off from landing location surface 40. As aerial vehicle 12 lifts off, package 14 continues to slide out of its stored position from within internal volume 34 to its delivery location on landing location surface 40. As package 14 leaves the stored position, it continues to slide down along package guides 20, 20' and through flexible fairing 30. Once package 14 is entirely released from its stored position, it is said to be delivered to landing location surface 40, and aerial vehicle 12 departs.

Figure 8:
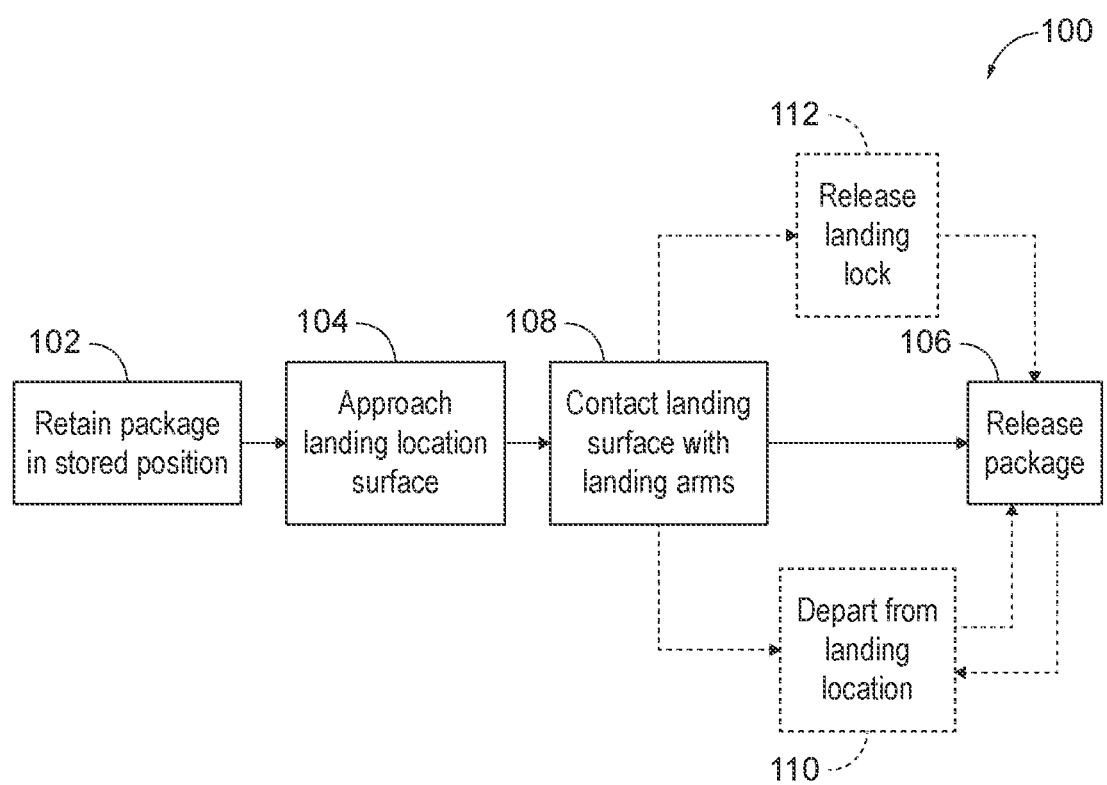
FIG. 8 is a schematic flowchart diagram representing examples of methods of delivering a package from an aerial vehicle, according to the present disclosure.

FIG. 8 schematically provides a flowchart that represents illustrative, non-exclusive examples of methods 100 for automatically delivering a package contained within an internal volume of an aerial vehicle according to the present disclosure. In FIG. 8, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 8 are not limiting and other methods and steps are within the scope of the present disclosure, including methods having greater than or fewer than the number of steps illustrated, as understood from the discussions herein.

Methods 100 may include retaining a package in a stored position such as an internal volume of an aerial vehicle (e.g., internal volume 34 of aerial vehicle 12) at 102, which is generally performed as long as a delivery condition is unmet, causing the aerial vehicle to approach a landing location surface where the package is to be delivered at 104, and releasing the package at 106, once the delivery condition is met, thereby depositing the package on the landing location surface. Causing the aerial vehicle to approach the landing location surface at 104 may include, for example, remotely controlling the aerial vehicle to cause it to approach the desired location for delivering the package, and/or programming or configuring an on-board processor on the aerial vehicle to do the same. Meeting the delivery condition may entail, for example, contacting the landing location surface with a first forward landing arm, a first aft landing arm, a second forward landing arm, and a second aft landing arm of an automatic package delivery system of the aerial vehicle, at 108. Said contacting at 108 may cause the first forward landing arm and the first aft landing arm to rotate to or past a first threshold landing position, and also cause the second forward landing arm and the second aft landing arm to rotate to or past a second threshold landing position, thereby meeting the delivery condition.

Methods 100 may include causing the aerial vehicle to depart from the landing location surface, at 110. Additionally or alternatively, methods 100 may include releasing a landing lock at 112, which may be performed before the package is released at 106. For example, a landing lock mechanism (e.g., landing lock mechanism 28) may be released at 112 automatically once a certain condition is met with respect to the landing arms of the delivery system, or the landing lock mechanism may be remotely actuated, such that the passive automatic delivery system is not triggered until the landing lock is released. Additionally or alternatively, a processing unit on board the aerial vehicle may be configured to cause the landing lock to be released once the aerial vehicle has reduced its altitude above the landing location surface below a threshold distance between itself and the landing location surface. As described in detail above in connection with examples of the delivery system, releasing the package from the aerial vehicle at 106 may include sliding the package out from the internal volume along a first package guide and a second package guide, and/or enlarging an outlet orifice of a flexible fairing of the automatic package delivery system, to allow the package to exit the internal volume through the outlet orifice.

Illustrative, non-exclusive examples of inventive subject matter according to the present disclosure are described in the following enumerated paragraphs:

A1. A delivery system (10) for an aerial vehicle (12), comprising:
 a first arm assembly (24), comprising:
  a first landing arm (16) configured to rotate in response to an applied external force, wherein the first landing arm (16) is configured to rotate between a first resting position and a first splayed position;
  a first resilient member (22) operatively coupled to the first landing arm (16) and configured to bias the first landing arm (16) towards the first resting position; and
  a first package guide (20) configured to at least partially retain a package (14) in a stored position when the first landing arm (16) is in the first resting position, wherein the first package guide (20) is coupled with respect to the first landing arm (16) such that rotation of the first landing arm (16) causes corresponding rotation of the first package guide (20), and wherein the first package guide (20) is configured to guide the package (14) from the stored position to deliver the package (14) once the first landing arm (16) is rotated towards the first splayed position and to or past a first threshold landing position, wherein the first threshold landing positon is in between the first resting position and the first splayed position.

A1.1. The delivery system (10) of paragraph A1, wherein the first package guide (20) is configured to at least partially retain the package (14) within the stored position when the first landing arm (16) is in the first resting position and when the first landing arm (16) is between the first resting position and the first threshold landing position.

A1.2. The delivery system (10) of paragraph A1 or A1.1, wherein the delivery system (10) is an automatic package delivery system (10).

A1.3. The delivery system (10) of any of paragraphs A1-A1.2, wherein the delivery system (10) is configured to deliver the package (14) from within an internal volume (34) of the aerial vehicle (12), wherein the stored position is in the internal volume (34).

A1.4. The delivery system (10) of any of paragraphs A1-A1.3, wherein the first resilient member (22) comprises a first torsion spring.

A1.5. The delivery system (10) of any of paragraphs A1-A1.4, wherein the first arm assembly (24) is configured such that rotation of the first landing arm (16) causes a change in mechanical energy stored in the first resilient member (22).

A2. The delivery system (10) of any of paragraphs A1-A1.5, wherein the first arm assembly (24) further comprises a first shaft (26) extending along a portion of an opening (36) to an/the internal volume (34) of the aerial vehicle (12).

A3. The delivery system (10) of paragraph A2, wherein the first landing arm (16) and the first package guide (20) are operatively coupled to the first shaft (26).

A4. The delivery system (10) of any of paragraphs A2-A3, wherein the first resilient member (22) is operatively coupled to the first shaft (26).

A5. The delivery system (10) of any of paragraphs A2-A4, wherein the first landing arm (16) and the first package guide (20) are configured to rotate about the first shaft (26).

A6. The delivery system (10) of any of paragraphs A2-A4, wherein rotation of the first shaft (26) causes rotation of the first landing arm (16) and the first package guide (20).

A7. The delivery system (10) of any of paragraphs A2-A6, wherein the first landing arm (16) comprises a plurality of first landing arms (16), wherein each first landing arm (16) of the plurality of first landing arms (16) is operatively coupled to the first shaft (26), wherein the first package guide (20) comprises a plurality of first package guides (20), and wherein each first package guide (20) of the plurality of first package guides (20) is operatively coupled to the first shaft (26).

A7.1. The delivery system (10) of paragraph A7, wherein each first landing arm (16) of the plurality of first landing arms (16) is configured to rotate together proportionally to the applied external force applied to one or more of the plurality of first landing arms (16).

A7.2. The delivery system (10) of paragraph A7 or A7.1, wherein each first package guide (20) of the plurality of first package guides (20) is configured to rotate together, corresponding to rotation of the plurality of first landing arms (16).

A7.3. The delivery system (10) of any of paragraphs A2-A7.2, wherein the first landing arm (16) comprises a first forward landing arm (46) and a first aft landing arm (48), wherein the first forward landing arm (46) and the first aft landing arm (48) are operatively coupled to the first shaft (26), wherein the first package guide (20) comprises a first forward package guide (54) and a first aft package guide (56), wherein the first forward package guide (54) and the first aft package guide (56) are operatively coupled to the first shaft (26).

A7.4. The delivery system (10) of any of paragraphs A2-A7.3, wherein the first shaft (26) couples a/the first forward landing arm (46) and a/the first aft landing arm (48) such that the first forward landing arm (46) and the first aft landing arm (48) rotate together between the first resting position and the first splayed position.

A7.5. The delivery system (10) of any of paragraphs A2-A7.4, wherein a/the first forward package guide (54) is positioned adjacent, coupled to, and/or integrally formed with a/the first forward landing arm (46), and wherein a/the first aft package guide (56) is positioned adjacent to, coupled to, and/or integrally formed with a/the first aft landing arm (48).

A8. The delivery system (10) of any of paragraphs A2-A7.5, wherein the first shaft (26) is mounted at least partially within an/the internal volume (34) of the aerial vehicle (12).

A9. The delivery system (10) of any of paragraphs A2-A8, wherein the first shaft (26) is mounted on the aerial vehicle (12).

A10. The delivery system (10) of any of paragraphs A1-A9, wherein when the first landing arm (16) is in the first resting position, the first landing arm (16) is positioned at least partially within an/the internal volume (34) of the aerial vehicle (12).

A11. The delivery system (10) of any of paragraphs A1-A10, wherein the first resilient member (22) has a selectively adjustable tension.

A12. The delivery system (10) of any of paragraphs A1-A11, wherein the first package guide (20) comprises a support extension (62) and at least one roller (64).

A13. The delivery system (10) of paragraph A12, wherein the support extension (62) is curved inwardly towards the stored position.

A14. The delivery system (10) of paragraph A12 or A13, wherein the support extension (62) extends in a first direction away from a second direction in which the first landing arm (16) extends.

A15. The delivery system (10) of any of paragraphs A1-A14, wherein the first package guide (20) is integrally formed with the first landing arm (16).

A16. The delivery system (10) of any of paragraphs A1-A15, wherein when the first landing arm (16) is in the first resting position, the first package guide (20) is positioned at least partially within an/the internal volume (34) of the aerial vehicle (12).

A17. The delivery system (10) of any of paragraphs A1-A16, wherein the first landing arm (16) and the first package guide (20) are in a substantially fixed orientation with respect to each other.

A18. The delivery system (10) of any of paragraphs A1-A17, wherein the first arm assembly (24) is configured such that increasing the applied external force causes the first landing arm (16) to rotate towards the first splayed position.

A19. The delivery system (10) of any of paragraphs A1-A18, wherein the first arm assembly (24) is configured such that decreasing the applied external force causes the first landing arm (16) to rotate towards the first resting position.

A20. The delivery system (10) of any of paragraphs A1-A19, wherein the first arm assembly (24) is configured such that the first landing arm (16) is in the first resting position when there is no external force applied to the first landing arm (16).

A21. The delivery system (10) of any of paragraphs A1-A20, wherein the first landing arm (16) is further configured to be selectively rotated past the first resting position to a stowed position in which the first landing arm (16) is at least partially stowed within an/the internal volume (34) of the aerial vehicle (12).

A22. The delivery system (10) of any of paragraphs A1-A21, wherein the first arm assembly (24) is configured such that the threshold landing position corresponds to greater than 50% of a total weight of the aerial vehicle (12) combined with the package (14) being applied to the first arm assembly (24) and a second arm assembly (24').

A23. The delivery system (10) of any of paragraphs A1-A22, wherein the first resilient member (22) is positioned within an/the internal volume (34) of the aerial vehicle (12).

A24. The delivery system (10) of any of paragraphs A1-A23, wherein the first package guide (20) is positioned within an/the internal volume (34) of the aerial vehicle (12).

A25. The delivery system (10) of any of paragraphs A1-A24, wherein the first arm assembly (24) comprises a first stop (66) configured to limit rotation of the first landing arm (16) such that it does not rotate past the splayed position when the first stop (66) contacts a body (32) of the aerial vehicle (12).

A26. The delivery system (10) of any of paragraphs A1-A25, wherein the delivery system (10) is passive.

A27. The delivery system (10) of any of paragraphs A1-A26, wherein the first resting position of the first landing arm (16) is substantially constant in the presence and absence of the package (14) within an/the internal volume (34) of the aerial vehicle (12).

A28. The delivery system (10) of any of paragraphs A1-A27, wherein the first resting position of the first landing arm (16) is substantially constant regardless of a weight of the package (14) within an/the internal volume (34) of the aerial vehicle (12).

A28.1. The delivery system (10) of any of paragraphs A1-A28, wherein the first resilient member (22) is configured such that the first landing arm (16) resists rotation towards the splayed position as a result of a/the weight of the package (14).

A28.2. The delivery system (10) of any of paragraphs A1-A28.1, wherein the first resilient member (22) is configured such that the first package guide (20) resists rotation as a result of pressure applied to the first package guide (20) from the package (14).

A29. The delivery system (10) of any of paragraphs A1-A28.2, further comprising a locking mechanism (28) configured to prevent release of the package (14) during an emergency landing.

A30. The delivery system (10) of paragraph A29, wherein the locking mechanism (28) comprises a servo lock configured to prevent rotation of the first landing arm (16) when the locking mechanism (28) is engaged.

A31. The delivery system (10) of any of paragraphs A1-A30, wherein the first package guide (20) is configured to guide the package (14) from the stored position as the aerial vehicle (12) ascends away from a landing location surface (40) where the delivery system (10) delivered the package (14).

A32. The delivery system (10) of any of paragraphs A1-A31, further comprising a flexible fairing (30).

A32.1. The delivery system (10) of paragraph A32, wherein the flexible fairing (30) covers at least part of an/the opening (36) to an/the internal volume (34) of the aerial vehicle (12).

A33. The delivery system (10) of paragraph A32 or A32.1, wherein the flexible fairing (30) comprises a slit (42) for the first landing arm (16) to extend through.

A34. The delivery system (10) of paragraph A32 or A32.1, wherein the flexible fairing (30) comprises a respective slit (42) for each respective first landing arm (16) to extend through.

A35. The delivery system (10) of any of paragraphs A32-A34, wherein the flexible fairing (30) is configured to at least partially retain the package (14) within an/the internal volume (34) of the aerial vehicle (12), in conjunction with the first package guide (20).

A36. The delivery system (10) of any of paragraphs A32-A35, wherein the flexible fairing (30) is configured to improve aerodynamic properties of the aerial vehicle (12).

A37. The delivery system (10) of any of paragraphs A32-A36, where the flexible fairing (30) is configured to limit an impact force at which the package (14) is delivered from the stored position.

A38. The delivery system (10) of any of paragraphs A32-A37, wherein the flexible fairing (30) comprises silicone.

A39. The delivery system (10) of any of paragraphs A32-A38, wherein the flexible fairing (30) comprises an outlet orifice (44) through which the delivery system (10) is configured to deliver the package (14) from the stored position.

A40. The delivery system (10) of paragraph A39, wherein the outlet orifice (44) is star-shaped.

A41. The delivery system (10) of paragraph A39 or A40, wherein the delivery system (10) is configured such that the outlet orifice (44) is enlarged as the first landing arm (16) is rotated towards the splayed position.

A42. The delivery system (10) of any of paragraphs A1-A41, further comprising a/the second arm assembly (24') that mirrors the first arm assembly (24).

A43. The delivery system (10) of paragraph A42, wherein the second arm assembly (24') comprises:

a second forward landing arm (50);

a second aft landing arm (52) operatively coupled to the second forward landing arm (50) such that the second forward landing arm (50) and the second aft landing arm (52) are configured to rotate together, in response to a second applied external force, between a second resting position and a second splayed position;

a second resilient member (22') operatively coupled to the second forward landing arm (50) and the second aft landing arm (52), wherein the second resilient member (22') is configured to bias the second forward landing arm (50) and the second aft landing arm (52) towards the second resting position, wherein the second arm assembly (24') is configured such that rotation of the second forward landing arm (50) and the second aft landing arm (52) causes a change in mechanical energy stored in the second resilient member (22');

a second forward package guide (58) substantially fixed with respect to the second forward landing arm (50); and a second aft package guide (60) substantially fixed with respect to the second aft landing arm (52), wherein the second forward package guide (58) and the second aft package guide (60) are configured to at least partially retain the package (14) in the stored position when the second forward landing arm (50) and the second aft landing arm (52) are in the second resting position, and wherein the second forward package guide (58) and the second aft package guide (60) are configured to guide the package (14) from the stored position to deliver the package (14) once the second forward landing arm (50) and the second aft landing arm (52) are rotated towards the first splayed position and to or past a second threshold landing position.

A43.1. The delivery system (10) of paragraph A43, wherein the second resilient member (22') comprises a second torsion spring.

A44. The delivery system (10) of any of paragraphs A1-A43.1, wherein the delivery system (10) is configured to retain the package (14) in the stored position until every landing arm (16, 16') of the delivery system (10) contacts a/the landing location surface (40).

A45. The delivery system (10) of any of paragraphs A1-A44, wherein the delivery system (10) is configured to retain the package (14) in the stored position until the first landing arm (16) is rotated towards the first splayed position past the first threshold landing position and a/the second forward landing arm (50) and a/the second aft landing arm (52) are rotated towards a/the second splayed position past a/the second threshold landing position.

A46. The delivery system (10) of any of paragraphs A1-A45, wherein a/the flexible fairing (30) is coupled to the aerial vehicle (12) such that it is stretched over a/the first forward landing arm (46), a/the first aft landing arm (48), a/the second forward landing arm (50), and a/the second aft landing arm (52).

A47. The delivery system (10) of any of paragraphs A1-A46, wherein an/the outlet orifice (44) of a/the flexible fairing (30) is enlarged via rotation of a/the first forward landing arm (46) and a/the first aft landing arm (48) towards the first splayed position and via rotation of a/the second forward landing arm (50) and a/the second aft landing arm (52) towards a/the second splayed position.

A48. The delivery system (10) of any of paragraphs A1-A47, wherein the first resilient member (22) and a/the second resilient member (22') are selected and/or selectively adjusted, based on a vehicle weight of the aerial vehicle (12) when the aerial vehicle (12) is devoid of the package (14).

A49. The delivery system (10) of any of paragraphs A1-A48, wherein the first arm assembly (24) is configured such that the first landing arm (16) is prevented from rotating to or past the first threshold landing position while one or more first landing arms (16) are spaced apart from a/the landing location surface (40).

A50. The delivery system (10) of any of paragraphs A1-A49, wherein the first arm assembly (24) is configured such that a/the first forward landing arm (46) and a/the first aft landing arm (48) are prevented from rotating to or past the threshold landing position unless a delivery condition is being met.

A51. The delivery system (10) of any of paragraphs A1-A50, wherein a/the second arm assembly (24') is configured such that a/the second forward landing arm (50) and a/the second aft landing arm (52) are prevented from rotating to or past a/the second threshold landing position unless a/the delivery condition is being met.

A52. The delivery system (10) of paragraph A50 or A51, wherein the delivery condition comprises at least a minimum loading force being applied to each of the first arm assembly (24) and a/the second arm assembly (24').

A53. The delivery system (10) of paragraph A52, wherein the minimum loading force corresponds to 25% of a/the vehicle weight of the aerial vehicle (12) when the aerial vehicle (12) is devoid of the package (14), such that a total loading force applied to the first arm assembly (24) and the second arm assembly (24') is at least 50% of the vehicle weight.

A54. The delivery system (10) of paragraph A52, wherein the minimum loading force corresponds to 25% of a loaded vehicle weight of the aerial vehicle (12) combined with the package (14), such that a total loading force applied to the first arm assembly (24) and the second arm assembly (24') is at least 50% of the loaded vehicle weight.

A54.1. The delivery system (10) of any of paragraphs A50-A54, wherein the delivery condition comprises at least a/the total loading force being applied to the first arm assembly (24) and a/the second arm assembly (24') that is at least 50% of the vehicle weight.

A55. The delivery system (10) of any of paragraphs A50-A54.1, wherein the delivery condition comprises at most a maximum loading force being applied to each of the first arm assembly (24) and a/the second arm assembly (24').

A56. The delivery system (10) of paragraph A55, wherein the maximum loading force comprises a/the vehicle weight of the aerial vehicle (12) when the aerial vehicle (12) is devoid of the package (14).

A57. The delivery system (10) of paragraph A55, wherein the maximum loading force comprises a/the loaded vehicle weight of the aerial vehicle (12) combined with the package (14).

B1. An automatic package delivery system (10) for an aerial vehicle (12) for delivering a package (14) contained within an internal volume (34) of the aerial vehicle (12), the automatic package delivery system (10) comprising:

a first arm assembly (24) comprising a first forward landing arm (46) and a first aft landing arm (48), wherein the first forward landing arm (46) and the first aft landing arm (48) are linked together such that the first forward landing arm (46) and the first aft landing arm (48) are configured to rotate together in response to a first external force applied to the first forward landing arm (46) and/or the first aft landing arm (48), wherein the first forward landing arm (46) and the first aft landing arm (48) are configured to rotate between a first resting position and a first maximally splayed position; and a second arm assembly (24') comprising a second forward landing arm (50) and a second aft landing arm (52), wherein the second forward landing arm (50) and the second aft landing arm (52) are linked together such that the second forward landing arm (50) and the second aft landing arm (52) are configured to rotate together in response to a second external force applied to the second forward landing arm (50) and/or the second aft landing arm (52), wherein the second forward landing arm (50) and the second aft landing arm (52) are configured to rotate between a second resting position and a second maximally splayed position, wherein the automatic package delivery system (10) is configured to retain the package (14) within the internal volume (34) until a delivery condition is met, wherein the automatic package delivery system (10) is configured to automatically release the package (14) from the internal volume (34) when the delivery condition is met, thereby delivering the package (14), and wherein the delivery condition is a passive delivery condition that depends on the positioning of the first arm assembly (24) and the second arm assembly (24').

B1.1. The automatic package delivery system (10) of paragraph B1, wherein the delivery condition comprises the first forward landing arm (46) and the first aft landing arm (48) being positioned between a first threshold landing position and the first maximally splayed position at the same time the second forward landing arm (50) and the second aft landing arm (52) are positioned between a second threshold landing position and the second maximally splayed position.

B1.2. The automatic package delivery system (10) of paragraph B1 or B1.1, wherein the automatic package delivery system (10) is configured to retain the package (14) within the internal volume (34) while the first forward landing arm (46) and the first aft landing arm (48) are positioned in the first resting position or between the first resting position and the first threshold landing position, and wherein the automatic package delivery system (10) is configured to retain the package (14) within the internal volume (34) while the second forward landing arm (50) and the second aft landing arm (52) are positioned in the second resting position or between the second resting position and the second threshold landing position.

B2. The automatic package delivery system (10) of any of paragraphs B1-B1.2, wherein the automatic package delivery system (10) is configured to automatically release the package (14) from the internal volume (34), thereby delivering the package (14), only if all of the first forward landing arm (46), the first aft landing arm (48), the second forward landing arm (50), and the second aft landing arm (52) are in contact with a landing location surface (40) on which the automatic package delivery system (10) is configured to deliver the package (14).

B3. The automatic package delivery system (10) of any of paragraphs B1-B2, further comprising a flexible fairing (30) having an outlet orifice (44) through which the package (14) exits the internal volume (34).

B4. The automatic package delivery system (10) of paragraph B3, wherein the flexible fairing (30) is coupled to the first arm assembly (24) and the second arm assembly (24') such that the outlet orifice (44) enlarges when the first forward landing arm (46) and the first aft landing arm (48) rotate towards the first maximally splayed position and when the second forward landing arm (50) and the second aft landing arm (52) rotate towards the second maximally splayed position.

B5. The automatic package delivery system (10) of any of paragraphs B1-B4, wherein the first arm assembly (24) comprises a first package guide (20), wherein the second arm assembly (24') comprises a second package guide (20'), and wherein the first package guide (20) and the second package guide (20') together are configured to at least partially retain the package (14) within the internal volume (34) until the automatic package delivery system (10) releases the package (14) from the internal volume (34), thereby delivering the package (14).

B6. The automatic package delivery system (10) of any of paragraphs B1-B5, wherein the first resting position and the second resting position are substantially constant in the presence and absence of the package (14) within the internal volume (34).

B7. The automatic package delivery system (10) of any of paragraphs B1-B6, wherein the first resting position and the second resting position are substantially constant regardless of a weight of the package (14) within the internal volume (34).

B8. The automatic package delivery system (10) of any of paragraphs B1-B7, wherein a/the first package guide (20) and a/the second package guide (20') are together configured to guide the package (14) out of the internal volume (34) as the aerial vehicle (12) ascends away from a/the landing location surface (40) where the automatic package delivery system (10) delivered the package (14).

B9. The automatic package delivery system (10) of any of paragraphs B1-B8, wherein a/the flexible fairing (30) is configured to at least partially retain the package (14) within the internal volume (34), in conjunction with a/the first package guide (20) and a/the second package guide (20').

B10. The automatic package delivery system (10) of any of paragraphs B1-B9, comprising a/the flexible fairing (30), wherein the flexible fairing (30) is coupled to the aerial vehicle (12) such that it is stretched over the first forward landing arm (46), the first aft landing arm (48), the second forward landing arm (50), and the second aft landing arm (52).

B11. The automatic package delivery system (10) of any of paragraphs B1-B10, wherein the automatic package delivery system (10) is configured such that the package (14) is not delivered if any of the first forward landing arm (46), the first aft landing arm (48), the second forward landing arm (50), and/or the second aft landing arm (52) are spaced apart from a/the landing location surface (40).

B12. The automatic package delivery system (10) of any of paragraphs B1-B11, wherein the delivery condition comprises all of the first forward landing arm (46), the first aft landing arm (48), the second forward landing arm (50), and the second aft landing arm (52) being in contact with a/the landing location surface (40).

B13. The automatic package delivery system (10) of any of paragraphs B1-B12, wherein the delivery condition comprises at least a minimum loading force being applied to each of the first forward landing arm (46), the first aft landing arm (48), the second forward landing arm (50), and the second aft landing arm (52).

B14. The automatic package delivery system (10) of paragraph B13, wherein the minimum loading force corresponds to 25% of a vehicle weight of the aerial vehicle (12) when the aerial vehicle (12) is devoid of the package (14), such that a total loading force applied to the first arm assembly (24) and the second arm assembly (24') is at least 50% of the vehicle weight.

B15. The automatic package delivery system (10) of paragraph B13, wherein the minimum loading force corresponds to 25% of a loaded vehicle weight of the aerial vehicle (12) combined with the package (14), such that a total loading force applied to the first arm assembly (24) and the second arm assembly (24') is at least 50% of the loaded vehicle weight.

B16. The automatic package delivery system (10) of any of paragraphs B1-B15, wherein the delivery condition comprises at least a/the total loading force being applied to the first arm assembly (24) and a/the second arm assembly (24') that is at least 50% of a/the vehicle weight of the aerial vehicle (12).

B17. The automatic package delivery system (10) of any of paragraphs B1-B16, wherein the delivery condition comprises at most a maximum loading force being applied to each of the first arm assembly (24) and a/the second arm assembly (24').

B18. The automatic package delivery system (10) of paragraph B17, wherein the maximum loading force comprises a/the vehicle weight of the aerial vehicle (12) when the aerial vehicle (12) is devoid of the package (14).

B19. The automatic package delivery system (10) of paragraph B17, wherein the maximum loading force comprises a/the loaded vehicle weight of the aerial vehicle (12) combined with the package (14).

C1. An aerial vehicle (12) comprising the automatic package delivery system (10) of any of paragraphs A1-A57 and/or the automatic package delivery system (10) of any of paragraphs B1-B19.

D1. A method (100) for automatically delivering a package (14) contained within an internal volume (34) of an aerial vehicle (12), the method (100) comprising:

retaining (102) the package (14) within the internal volume (34), while a delivery condition is unmet;

causing the aerial vehicle (12) to approach (104) a landing location surface (40) where the package (14) is to be delivered;

contacting (108) the landing location surface (40) with a first forward landing arm (46), a first aft landing arm (48), a second forward landing arm (50), and a second aft landing arm (52) of an automatic package delivery system (10) of the aerial vehicle (12), wherein the contacting (108) causes the first forward landing arm (46) and the first aft landing arm (48) to rotate to or past a first threshold landing position, and wherein the contacting (108) causes the second forward landing arm (50) and the second aft landing arm (52) to rotate to or past a second threshold landing position, thereby meeting the delivery condition; and releasing (106) the package (14) from the internal volume (34) to deposit the package (14) on the landing location surface (40).

D2. The method (100) of paragraph D1, wherein the automatic package delivery system (10) comprises the automatic package delivery system (10) of any of paragraphs A1-A57 and/or the automatic package delivery system (10) of any of paragraphs B1-B19.

D3. The method (100) of any of paragraphs D1-D2, further comprising causing the aerial to depart (110) from the landing location surface (40).

D4. The method (100) of any of paragraphs D1-D3, further comprising releasing a landing lock (28).

D5. The method (100) of any of paragraphs D1-D4, wherein the first forward landing arm (46) and the first aft landing arm (48) automatically return to a first resting position and wherein the second forward landing arm (50) and the second aft landing arm (52) automatically return to a second resting position when the aerial vehicle (12) is airborne after delivering the package (14) to the landing location surface (40).

D6. The method (100) of any of paragraphs D1-D5, wherein the releasing (106) the package (14) comprises sliding the package (14) out from the internal volume (34) along a first package guide (20) and a second package guide (20').

D7. The method (100) of any of paragraphs D1-D6, wherein the releasing (106) the package (14) comprises enlarging an/the outlet orifice (44) of a/the flexible fairing

(30) of the automatic package delivery system (10), to allow the package (14) to exit the internal volume (34) through the outlet orifice (44).

E1. The use of the automatic package delivery system (10) of any of paragraphs A1-A57 and/or the automatic package delivery system (10) of any of paragraphs B1-B19 to automatically and passively deliver a package (14) contained within an internal volume (34) of an aerial vehicle (12).

As used herein, the terms "selective" and "selectively," when modifying an action, movement, configuration, or other activity of one or more components or characteristics of an apparatus, mean that the specific action, movement, configuration, or other activity is a direct or indirect result of dynamic processes and/or user manipulation of an aspect of, or one or more components of, the apparatus. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one example, to at least one, optionally including more than one, A, with no B present (and optionally including entities other than B); in another example, to at least one, optionally including more than one, B, with no A present (and optionally including entities other than A); in yet another example, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, or A, B, and C together, and optionally any of the above in combination with at least one other entity.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, examples, and/or methods according to the present disclosure, are intended to convey that the described component, feature, detail, structure, example, and/or method is an illustrative, non-exclusive example of components, features, details, structures, examples, and/or methods according to the present disclosure. Thus, the described component, feature, detail, structure, example, and/or method is not intended to be limiting, required, or exclusive/exhaustive; and other components, features, details, structures, examples, and/or methods, including structurally and/or functionally similar and/or equivalent components, features, details, structures, examples, and/or methods, are also within the scope of the present disclosure.

What is claimed is:

1. A delivery system for an aerial vehicle, comprising:
    a first arm assembly, comprising:
        a first landing arm configured to rotate in response to an applied external force, wherein the first landing arm is configured to rotate between a first resting position and a first splayed position;
        a first resilient member operatively coupled to the first landing arm and configured to bias the first landing arm towards the first resting position; and
        a first package guide configured to at least partially retain a package in a stored position when the first landing arm is in the first resting position, wherein the first package guide is coupled with respect to the first landing arm such that rotation of the first landing arm causes corresponding rotation of the first package guide, and wherein the first package guide is configured to guide the package from the stored position to a released position when the first landing arm is rotated towards the first splayed position and to or past a first threshold landing position, wherein the first threshold landing position is in between the first resting position and the first splayed position.

2. The delivery system according to claim 1, wherein the first package guide is configured to at least partially retain the package within an internal volume of the aerial vehicle when the first landing arm is in the first resting position and when the first landing arm is between the first resting position and the first threshold landing position.

3. The delivery system according to claim 2, wherein the first arm assembly further comprises a first shaft extending along a portion of an opening to the internal volume, wherein the first landing arm, the first package guide, and the first resilient member are operatively coupled to the first shaft.

4. The delivery system according to claim 3, wherein the first landing arm comprises a first forward landing arm and a first aft landing arm, wherein the first forward landing arm and the first aft landing arm are operatively coupled to the first shaft, wherein the first package guide comprises a first forward package guide and a first aft package guide, and wherein the first forward package guide and the first aft package guide are operatively coupled to the first shaft such that the first forward landing arm and the first aft landing arm rotate together between the first resting position and the first splayed position.

5. The delivery system according to claim 1, wherein the first resilient member has a selectively adjustable tension.

6. The delivery system according to claim 1, wherein the first package guide comprises a support extension and at least one roller, wherein the support extension is configured to curve inwardly towards an internal volume of the aerial vehicle, and wherein the support extension extends in a first direction away from a second direction in which the first landing arm extends.

7. The delivery system according to claim 1, wherein the first landing arm and the first package guide are in a substantially fixed orientation with respect to each other.

8. The delivery system according to claim 1, wherein the first arm assembly is configured such that increasing the applied external force causes the first landing arm to rotate towards the first splayed position, wherein the first arm assembly is configured such that decreasing the applied external force causes the first landing arm to rotate towards the first resting position, and wherein the first arm assembly is configured such that the first landing arm is in the first resting position when there is no external force applied to the first landing arm.

9. The delivery system according to claim 1, wherein the first arm assembly comprises a first stop configured to limit rotation of the first landing arm such that it does not rotate past the first splayed position when the first stop contacts a body of the aerial vehicle.

10. The delivery system according to claim 1, further comprising the aerial vehicle, wherein the first package guide is configured to guide the package from the stored position as the aerial vehicle ascends away from a landing location surface where the delivery system delivered the package.

11. The delivery system according to claim 1, further comprising a flexible fairing covering at least part of an opening to an internal volume of the aerial vehicle in which the package is stored in the stored position, wherein the flexible fairing comprises a slit for the first landing arm to extend through, wherein the flexible fairing is configured to limit an impact force at which the package is delivered from the internal volume.

12. The delivery system according to claim 11, wherein the flexible fairing comprises an outlet orifice through which the delivery system is configured to deliver the package out from the internal volume, wherein the delivery system is configured such that the outlet orifice is enlarged as the first landing arm is rotated towards the first splayed position.

13. An automatic package delivery system for an aerial vehicle for delivering a package contained within an internal volume of the aerial vehicle, the automatic package delivery system comprising:
   a first arm assembly comprising a first forward landing arm and a first aft landing arm, wherein the first forward landing arm and the first aft landing arm are linked together such that the first forward landing arm and the first aft landing arm are configured to rotate together in response to a first external force applied to the first forward landing arm and/or the first aft landing arm, wherein the first forward landing arm and the first aft landing arm are configured to rotate between a first resting position and a first splayed position; and
   a second arm assembly comprising:
      a second forward landing arm; and
      a second aft landing arm, wherein the second forward landing arm and the second aft landing arm are linked together such that the second forward landing arm and the second aft landing arm are configured to rotate together in response to a second external force applied to the second forward landing arm and/or the second aft landing arm, wherein the second forward landing arm and the second aft landing arm are configured to rotate between a second resting position and a second splayed position, wherein the automatic package delivery system is configured to retain the package within the internal volume until a delivery condition is met, wherein the automatic package delivery system is configured to automatically release the package from the internal volume when the delivery condition is met, thereby delivering the package, and wherein the delivery condition is a passive delivery condition that depends on positioning of the first arm assembly and the second arm assembly.

14. The automatic package delivery system according to claim 13, wherein the delivery condition comprises the first forward landing arm and the first aft landing arm being positioned between a first threshold landing position and the first splayed position at the same time the second forward landing arm and the second aft landing arm are positioned between a second threshold landing position and the second splayed position.

15. The automatic package delivery system according to claim 13, wherein the automatic package delivery system is configured to retain the package within the internal volume while the first forward landing arm and the first aft landing arm are positioned in the first resting position or between the first resting position and a first threshold landing position, and wherein the automatic package delivery system is configured to retain the package within the internal volume while the second forward landing arm and the second aft landing arm are positioned in the second resting position or between the second resting position and a second threshold landing position.

16. The automatic package delivery system according to claim 13, wherein the automatic package delivery system is configured to automatically release the package from the internal volume, thereby delivering the package, only if all of the first forward landing arm, the first aft landing arm, the second forward landing arm, and the second aft landing arm are in contact with a landing location surface on which the automatic package delivery system is configured to deliver the package.

17. The automatic package delivery system according to claim 13, further comprising a flexible fairing having an outlet orifice through which the package exits the internal volume, wherein the flexible fairing is coupled to the first arm assembly and the second arm assembly such that the outlet orifice enlarges when the first forward landing arm and the first aft landing arm rotate towards the first splayed position and when the second forward landing arm and the second aft landing arm rotate towards the second splayed position.

18. The automatic package delivery system according to claim 13, wherein the first arm assembly comprises a first package guide, wherein the second arm assembly comprises a second package guide, and wherein the first package guide and the second package guide together are configured to at least partially retain the package within the internal volume until the automatic package delivery system releases the package from the internal volume, thereby delivering the package.

19. The automatic package delivery system according to claim 13, wherein the delivery condition comprises at least a minimum loading force being applied to each of the first forward landing arm, the first aft landing arm, the second forward landing arm, and the second aft landing arm, and wherein the delivery condition comprises at most a maximum loading force being applied to each of the first arm assembly and the second arm assembly.

20. A method for automatically delivering a package contained within an internal volume of an aerial vehicle, the method comprising:
  retaining the package within the internal volume, while a delivery condition is unmet;
  causing the aerial vehicle to approach a landing location surface where the package is to be delivered;
  contacting the landing location surface with a first forward landing arm, a first aft landing arm, a second forward landing arm, and a second aft landing arm of an automatic package delivery system of the aerial vehicle, wherein the contacting causes the first forward landing arm and the first aft landing arm to rotate to or past a first threshold landing position, and wherein the contacting causes the second forward landing arm and the second aft landing arm to rotate to or past a second threshold landing position, thereby meeting the delivery condition; and
  releasing the package from the internal volume to deposit the package on the landing location surface.

* * * * *